United States Patent [19]
Stilwagen et al.

[11] Patent Number: 5,386,841
[45] Date of Patent: Feb. 7, 1995

[54] NON-CHEMICAL LOBSTER TRAP CLEANING APPARATUS

[76] Inventors: Edward Stilwagen, P.O. Box 556, East Marion, N.Y. 11939; Edward Rodman, 7 High Hollow La., Miller Place, N.Y. 11764

[21] Appl. No.: 64,415

[22] Filed: May 19, 1993

[51] Int. Cl.⁶ ............................... B08B 3/10
[52] U.S. Cl. .................. 134/57 R; 134/58 R; 134/104.4; 134/105
[58] Field of Search .............. 134/57 R, 58 R, 104.4, 134/105, 107

[56] References Cited

U.S. PATENT DOCUMENTS

| | | |
|---|---|---|
| 150,774 | 5/1874 | Morgan . |
| 1,053,664 | 2/1913 | Sommer . |
| 1,191,526 | 7/1916 | Meaker . |
| 1,517,097 | 11/1924 | Podel . |
| 1,526,899 | 2/1925 | Bundy . |
| 1,624,982 | 4/1927 | Rosenberg ............... 134/105 X |
| 1,726,652 | 9/1929 | Crapo . |
| 1,787,141 | 12/1930 | Carroll . |
| 1,801,888 | 4/1931 | Teeple, Jr. . |
| 2,019,445 | 10/1935 | Crapo . |
| 2,374,926 | 5/1945 | Fink . |
| 2,520,658 | 8/1950 | Rheem et al. . |
| 2,614,571 | 10/1952 | Turpin ........................ 134/61 |
| 2,852,410 | 9/1958 | Brewer . |
| 3,006,351 | 10/1961 | Grube ....................... 134/105 X |
| 3,010,844 | 11/1961 | Klein et al. . |
| 3,278,331 | 10/1966 | Taylor et al. . |
| 3,320,085 | 5/1967 | Turner, Jr. . |
| 3,613,700 | 10/1971 | Werth et al. .............. 134/57 |
| 3,753,762 | 8/1973 | Garrison . |
| 3,924,035 | 12/1975 | Miller ....................... 427/327 |
| 4,096,300 | 6/1978 | William et al. ........... 427/292 |
| 4,255,467 | 3/1981 | Bounds ..................... 427/142 |

FOREIGN PATENT DOCUMENTS 26794 2/1986 Japan ...................... 134/107

OTHER PUBLICATIONS

Brochure of Pressure Washer No. 32658 of W.W. Granger Co., Inc. of Chicago, Illinois.

Primary Examiner—Philip R. Coe
Attorney, Agent, or Firm—Alfred M. Walker

[57] ABSTRACT

A hollow heating chamber is provided for cleaning dirty lobster traps without any scouring detergents or chemical bath preparations, which, according to the FDA regulations cannot be used in physical contact with any edible food, which includes lobsters. A manifold with baffles is provided immersed within heated water within the heated chamber. A fuel oil burner is provided as a source of heat, for directing flames though the baffled manifold and then out an exhaust pipe. The lobster traps, with dirt, marine organisms, barnacles, etc., are immersed within the heating chamber and cleaned effectively without the hazard of detergents or chemical bath preparations being in contact with the portions of the lobster traps which engage and trap live lobsters for human consumption.

18 Claims, 4 Drawing Sheets

NON-CHEMICAL LOBSTER TRAP CLEANING APPARATUS

FIELD OF THE INVENTION

The present invention pertains to a spill resistant heating chamber apparatus for use on board a seaworthy lobster boat vessel, for cleaning dirty lobster traps under heat below boiling at atmospheric pressure, without any scouring detergents or caustic chemical bath preparations, which cannot be used in physical contact with any edible food, which includes live lobsters.

The typical lobster trap includes a structure of wire mesh or wooden slats, connected by fasteners such as screws or nails in a hollow, box-type structure. Two of the walls have funnel type openings which permit the entry of a lobster into the lobster trap, but not its exit.

Since the edible lobster comes in contact with the slats or wires of the trap, government health and food regulations prohibit the use of caustic chemical cleansers upon the surfaces of the wooden slats or vinyl covered wires.

Stainless steel cooking pots, unlike wooden or vinyl covered lobster pot traps, can be cleaned with dissolvable scouring products and bactericidal soaps, because the cooking pot can be thoroughly rinsed of the cleaning products. But wood or vinyl lobster trap slats, and certainly the rope or wiring lines, because of numerous crevasses, cannot be thoroughly rinsed. Thus, there is the need for the present invention, which cleans all the exposed and hidden surfaces of the lobster traps without any scouring cleansers, cleaning chemicals or high pressure water sprays.

The present invention includes a heated water chamber, preferably salt water, with an immersion type manifold with baffles. The lobster traps are immersed in the heated water at 1 bar atmospheric pressure, within the heated chamber. A low voltage, such as 12 VDC, fuel oil burner is provided as a source of heat, for directing flames though the baffled manifold immersion heater and then out an exhaust pipe.

The lobster traps, with accumulated dirt, marine organisms, barnacles, etc., are immersed within the heating chamber and cleaned effectively in preferably salt water heated below boiling point water temperature of 212° F. or 100° C. at sea level at standard air pressure of 1 bar atmospheric pressure, without the hazard of detergents, chemical bath preparations or high pressure water sprays being in contact with the surface portions of the lobster traps which engage and trap live lobsters for human consumption.

The design of the baffled immersed heating manifold is important to transfer heat as quickly as possible on board a lobster fishing boat, which has limited fuel oil storage capacity. It is also necessary to limit gross weight on board a lobster boat as much as possible. That is, one cannot waste space with large fuel oil storage tanks on board the cramped quarters of a lobster fishing boat.

DESCRIPTION OF THE PRIOR ART

In contrast to the present invention, it is known in the lobster trap fishing industry to traditionally clean lobster traps two or three times per year in the following manners:

1) by removing lobster traps from the local fishing area to shore where in two to four weeks organisms, seaweed, or barnacles, etc. die off; then the traps are transported by boat to be placed back in the fishing area site;

2) by manually scraping, which is archaic and extremely time consuming, for example, by up to ten minutes per lobster trap;

3) by high pressure cleaners, which have a habit of blowing off or at least damaging the wooden or vinyl lobster traps; moreover, high pressure cleaners are unsafe to use, as dangerous gasoline is required to run the high pressure cleaners, and flying debris may cause injury to the eyes and skin, as well as creating hazardous accumulations of debris on the lobster fishing boat deck;

4) by illegally using chlorine based chemicals in violation of FDA and local health department regulations, which also pose disposal problems of the chlorinated water, as the chlorine based chemicals find their way to the sea water.

In the non-analogous metal cleaning art, various attempts have been made to clean metal parts in heated bath preparation vessels. However, these vessels are used in conjunction with toxic chemical preparations, which is contraindicated for lobster traps, the parts of which traps should not be contaminated with chemicals.

Among the prior art is the U.S. Pat. No. 3,613,700 of Werth. However, the Werth '700 device holds a chemical liquid solvent for metal stripping, such as phosphoric acid, which is totally contraindicated for use with lobster trap surfaces, which could contaminate edible lobsters within the trap. Werth '700 is also multicompartmental, and not insulated like the present invention, and filters are provided in updraft ducts.

Other non-analogous patents for heaters include U.S. Pat. Nos. 1,624,982 of Rosenberg, 1,801,888 of Teeple and 2,614,571 of Turpin, which also pertain to chemical solution heating chambers, which are contraindicated for edible food, such as lobsters, caught in lobster traps.

Moreover, the related prior art includes U.S. Pat. No. 4,255,467 of Bounds, which describes a three step, onshore cleaning process for zinc galvanizing wire fish and lobster traps. In the Bounds '467 device, soiled traps are first incinerated to remove barnacles, debris, living organisms and salt, as well as to remove the damaged layer of galvanized zinc so that the lobster traps, when clean, can be re-galvanized with a zinc coating. In Bounds '467, cleaning is for an entirely different reason, namely as a preparation for re-galvanizing. In contrast, the cleaning is to allow for re-fishing of lobsters with the lobster traps.

The second step in Bounds '467 involves subjecting the external surfaces of the lobster traps with a high pressure stream of water from nozzles.

The third step in Bounds '467 includes the further step of re-coating the bare wires with a fresh coat of zinc.

However, the Bounds '467 device is contraindicated for conventional, ungalvanized wooden or vinyl coated wire lobster traps.

First, it is known that melting zinc requires heat in excess of 600 degrees Fahrenheit, whereas vinyl will melt at 250 degrees Fahrenheit and wooden slats will incinerate at 450 degrees Fahrenheit.

Therefore the Bounds '467 device cannot be used with conventional vinyl coated wire or wooden lobster traps.

SUMMARY OF THE INVENTION

In contrast, to the prior art, the on-board apparatus of the present invention utilizes water heated to 140–160 degrees Fahrenheit to thoroughly kill substantially all marine organisms, barnacles, accumulated debris and seaweed from conventional lobster traps, without damaging the wooden slats or vinyl covered wires of the lobster traps.

A further problem associated with the prior art of the Bounds '467 device is that the second step of Bounds '467 involves applying high pressure streams of water from nozzles. First, high pressure water may damage the slats or joints of the lobster traps, as well as present dangers to personnel using the device.

As stated before, it has been known to use high pressure pumps, such as Pressure Washer No. 32658 of W. W. Granger Co., Inc of Chicago, Ill. These gasoline driven high pressure pumps create hard streams of water in the range of 1500 psi to 2500 psi.

The high pressure pump cleaners are not efficient, because the hard driven streams of water cannot effectively reach all the interior crevices and corners of a lobster trap.

Moreover, it has been known that the high pressure streams of water can wash away seaweed, microorganisms and accumulated debris, but clinging barnacles are resistant to the high pressure water streams, and must be still manually scraped off in the cleaning process utilizing high pressure streams of water, thus taking up to five additional minutes of cleaning time per trap.

In contrast, the present invention applies moist heat at 140–160 degrees Fahrenheit at 1 bar atmospheric pressure to soften the shells of the barnacles, causing the barnacles to easily fall off the surfaces of a wooden or vinyl covered wire lobster trap being cleaned by the present invention, in a matter of fifteen to twenty seconds per trap being cleaned by the present invention.

The third step of the Bounds '467 cleaning process includes dipping the now bare-wired walls of the lobster traps into a heated preflux before dipping them in molten zinc, followed by a vibrating step as the traps are removed from the molten zinc to effect an even re-coating of galvanized zinc upon the wire mesh netting of the galvanized lobster traps.

This third step is needed because Bounds '467 teaches the process of factory re-galvanizing of the trap and the present invention deals solely with the re-fishing of the trap. The present invention applies water heated from 140–160 degrees Fahrenheit at 1 bar atmospheric pressure and does not remove or damage the vinyl coating of the wires, or the wooden slats, of either type of conventional lobster traps.

In contrast, the 140–160 degrees Fahrenheit heat of the heated water within which the lobster trap is immersed in the lobster cleaner of the present invention is known to thoroughly kill marine growth on the wooden and vinyl slats and rope lines of the lobster traps, such as barnacles, algae, sea grasses and kelp.

Also, killing the organisms in such a manner releases the attached organisms from the surfaces of the lobster trap. For example, upon 15 seconds exposure to the heated water, hard, crusty barnacles will become soft and easily fall off of the surfaces of the lobster trap, as will other marine growths.

The present invention also includes an anti-splash feature to counteract the pitch and roll of the lobster fishing boat at sea. For example, the generally rectangular water heating chamber is provided with an inwardly extending lip, to prevent edge spillovers of hot water during the lobster trap cleansing operation.

In addition, the present invention also includes a floating horizontal perforated baffle to keep water within the chamber during the journey of the boat to the site where the lobster traps are hauled. The lobster trap is placed upon the floating baffle during cleaning causing the floating baffle to sink within the heating chamber. Moreover, the floating horizontal baffle floats to the top of the chamber to prevent water from splashing out when the chamber is not in use.

The present invention includes an external heat source, such as an oil burner, which runs off of the fuel oil tanks of the boat.

Because the present invention can be used to clean lobster traps at sea, the present invention is economical, and saves the typical lobster fisherman considerable sums of money in cleaning the lobster traps of accumulated debris, barnacles and microorganisms.

Typically, a lobster fisherman has a small open boat with a 10×20 foot work deck, and a plurality of lobster traps attached by a line, which lobster traps are dropped into a designated area of a bay or a portion of the ocean.

It is desirable to be able to clean the lobster traps when the lobster boat is drifting over the site where the lobster traps are set to harvest lobsters within the salt water bays and oceans of the coast.

The present invention improves over the predominate prior art, which prior art requires the necessity of removing the plurality of lobster traps, numbering into the thousands, bringing them back to shore, which is up to a full week's work. When on land, the lobster traps are cleaned by letting the traps sit inactive in the sun for two weeks or more on the shore, and the barnacles are still difficult to remove.

This on shore hauling of the lobster traps from the sea is not cost effective. It is known that the average cost of cleaning the lobster traps by bringing them out of the water to sit inactive for two weeks or more is $6.00 per trap per year, since it is done at a minimum of twice a year and it costs $3.00 per trap to process the hauling in of the traps and waiting until the traps can be re-laid in the bay or ocean two weeks or more later.

It is also known that the net loss of lobster product lost during two weeks of inactivity on shore is $200 per trap.

Since the average lobster fisherman has 500–1000 traps per lobster boat, considerable sums of money are lost in letting the traps sit inactive for two weeks or more.

Therefore, there is a long felt need to provide a lobster trap cleaning apparatus, which can clean the lobster traps on board a small lobster boat on site at the location of the traps in the bay or ocean.

Unless the lobster fisherman uses the impractical high pressure cleaners, which are dangerous and destructive to the traps, or uses illegal chlorine as noted before, the traps in the past have not been able to be cleaned on site.

Therefore, the present invention solves this problem by providing an immersion heater on site at the ocean or bay, where the traps can be quickly and thoroughly cleaned and returned to the water to harvest more lobsters.

OBJECTS OF THE INVENTION

It is an object of the present invention to clean the lobster traps, without cleaning chemicals, under adverse sea conditions, with limited spatial resources and with strict safety requirements, given the pitch and roll of the lobster boat at sea.

It is a further object of the present invention to avoid the use of explosive gasoline fuel at sea, or the use of electrical heaters for the heating element.

It is a further object of the present invention to use 140-160 degree F. heated water to kill the marine organisms.

It is a further object of the present invention to clean the lobster traps of microorganisms killed.

It is yet another object of the present invention to provide a heating chamber for cleaning dirty lobster traps without any scouring detergents or chemical bath preparations.

It is a further object of the present invention to improve over the prior art.

DESCRIPTION OF THE DRAWINGS

Other objects of the present invention will become apparent when viewed in conjunction with the drawings of the present invention in which.

DESCRIPTION OF THE PREFERRED EMBODIMENT

Figure 1:
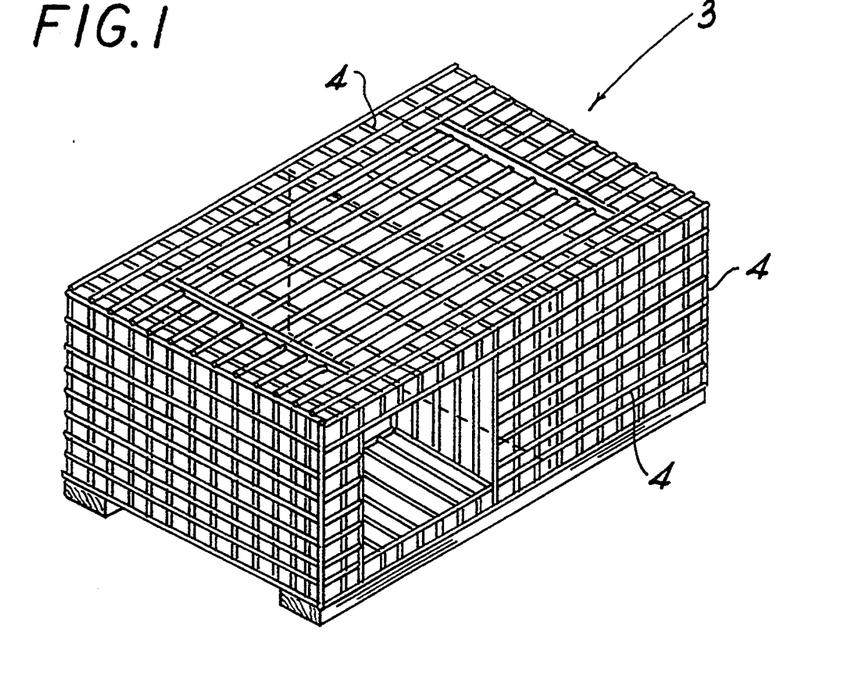
FIGS. 1 and 1a are prior art lobster traps.
Figure 1A:
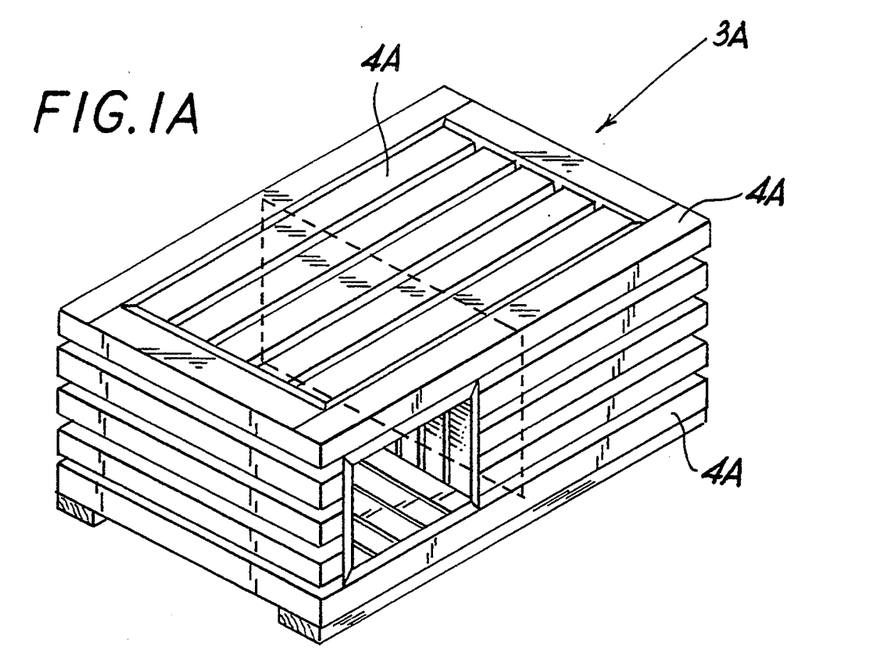

As shown in FIGS. 3-8, the lobster trap cleaning apparatus 1 includes a hollow heating chamber 2 for cleaning a dirty lobster trap 3 without any scouring detergents or chemical bath preparations A typical prior art lobster trap 3 of the kind which the present invention is concerned is shown at FIGS. 1 and 1A.

The conventional trap in FIG. 1 includes a box-like frame made from vinyl covered steel mesh, clamped together. The trap typically measures about three feet in length on each side, and includes on each of its sides the vinyl covered wires. Two openings are provided in the sides of the lobster trap 3. Lobster bait is located within the trap, and the trap top is hinged so that it can be opened and closed.

FIG. 1A shows a wooden slat-type prior art lobster trap where wooden slats are screwed or nailed to a wooden frame, wherein the trap is of similar dimensions as the trap in FIG. 1.

Figure 2:
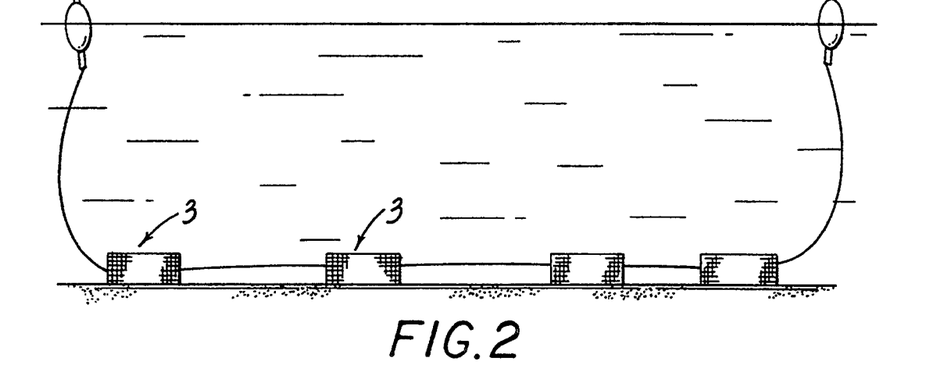
FIG. 2 is a schematic view of a train of a plurality of prior art lobster traps.
Figure 3:
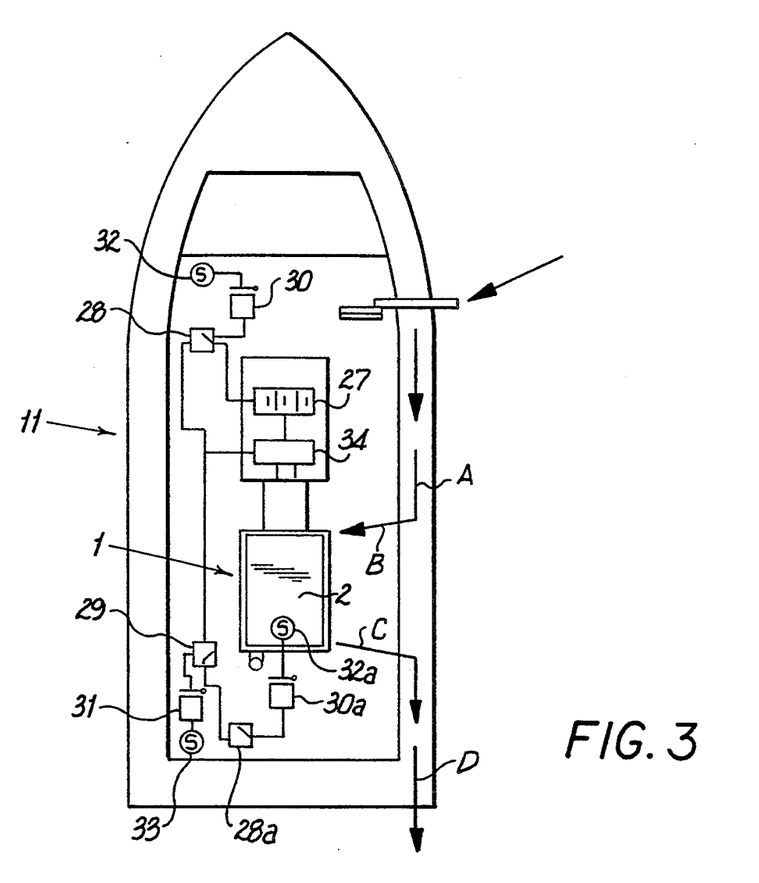
FIG. 3 is a top plan view of the lobster trap cleaning apparatus, shown in position within a lobster fishing boat.
Figure 4:
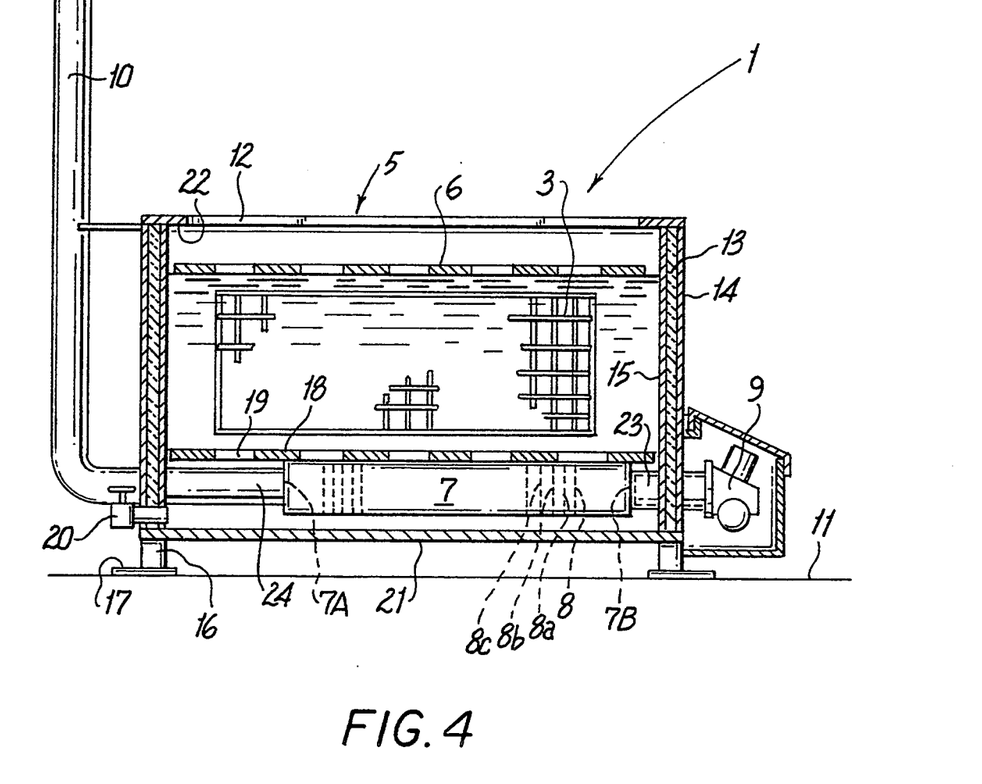
FIG. 4 is a side elevational view of the lobster cleaning apparatus, as shown in FIG. 3.
Figure 5:
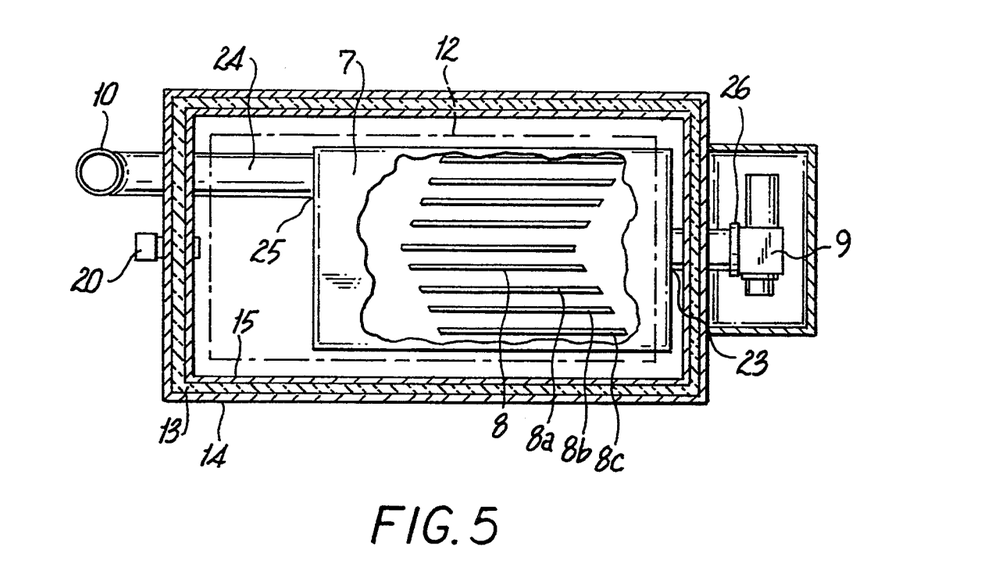
FIG. 5 is a top plan view of the apparatus in FIG. 3, shown in partial cut-away section.
Figure 6:
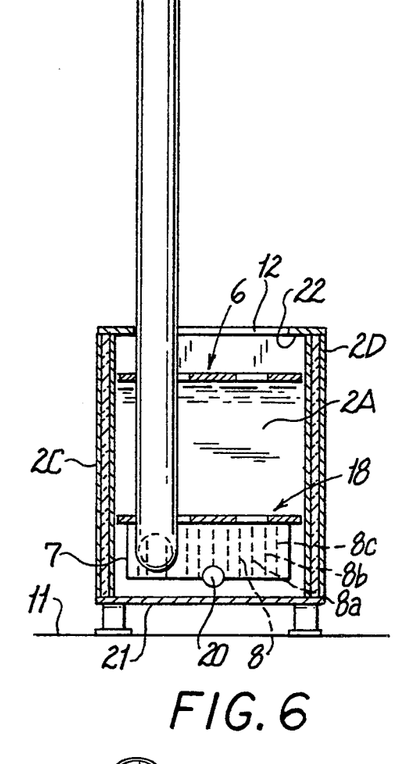
FIG. 6 is a front elevational view of the apparatus thereof.
Figure 7:
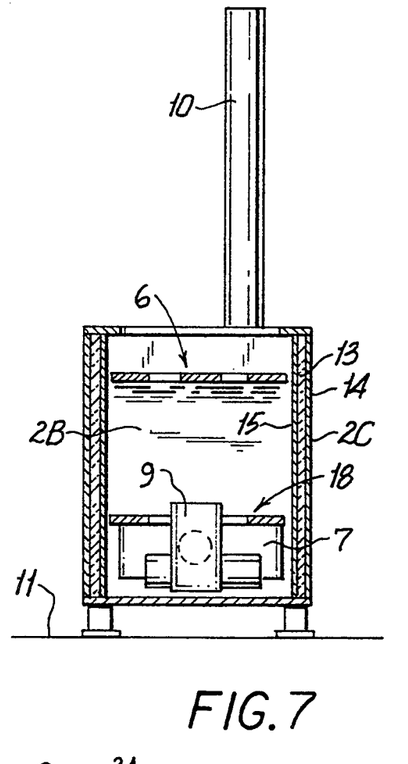
FIG. 7 is a rear elevational view of the apparatus thereof.
Figure 8:
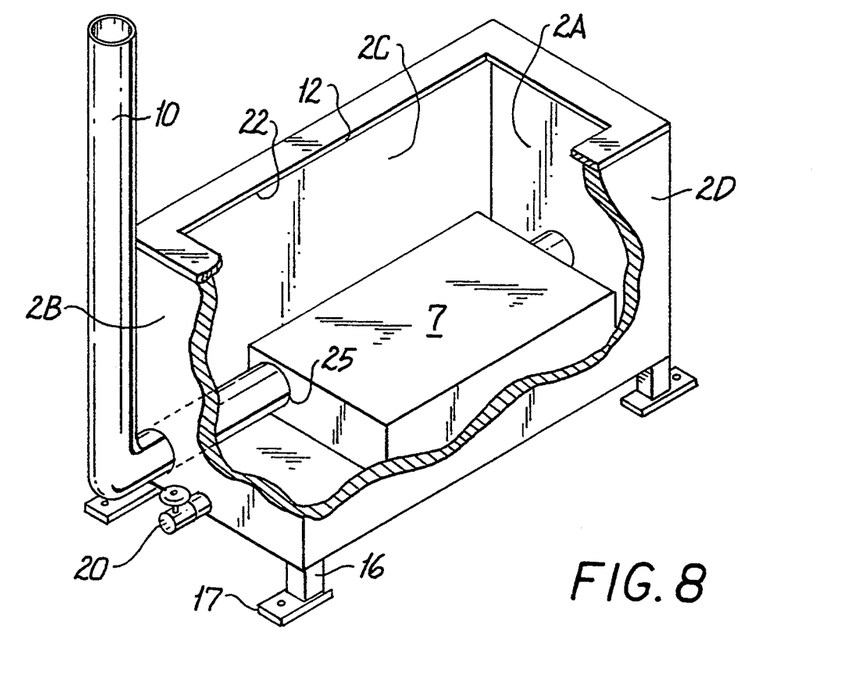
FIG. 8 is an isometric view thereof in partial cut-away section.

As shown in FIG. 2, most lobster traps 3 are set at sea in use in a train of connected lobster traps, wherein the traps 3 are connected by rope or cord lines, which lines connect the train of traps with floating buoys to enable the lobster fisherman to locate the traps, i.e. a "trawl." As also shown in FIG. 3, typically, five to ten traps are moved along the side of boat 11 in the direction shown by arrow A until they are each moved in the direction shown by arrow B to apparatus 1 for cleaning, and thence in directions C and D back to the sea.

Turning now to FIGS. 3-8, the apparatus 1 of the present invention for cleaning a lobster trap 3 includes an elongated housing having a water containing immersion chamber 2, which immersion chamber 2 has a top entrance 5, which preferably is closed by a floating baffle board 6 when not in use.

The chamber 2 is supported above the floor of the boat 11 by a base 16, preferably including support footings 17.

The heating chamber 2 is generally rectangular, which chamber 2 cleans the lobster traps 3 by immersion in heated water within chamber 2 at below the boiling point of water which is measured traditionally at a water temperature of 212° F. or 100° C. at sea level, and at approximately 1 bar of atmospheric pressure, without the need to use any scouring cleansers or cleaning chemicals.

A manifold heating element 7 with baffles 8, 8a, 8b, 8c, etc. is provided within the heated chamber 2 to heat fresh or salt water therein. A fuel oil burner 9 is provided as a source of heat, for directing flames through the baffled manifold heating element 7, and then out an exhaust, such as pipe 10. Preferably, fuel oil burner 9 is in communication with the diesel engine fuel supply of lobster boat 11.

The lobster traps 3 which are contaminated with dirt, marine organisms, barnacles, etc., are immersed within the heated water within heating chamber 2 for approximately 15-20 seconds, and cleaned effectively without the use of hazardous detergents or chemical bath preparations being in contact with the portions of the lobster traps 3, which engage and trap live lobsters for human consumption.

The interior structural configuration of the baffled immersion heating element 7 is important to transfer heat as quickly as possible on board a lobster fishing boat 11 at sea, which boat 11 has limited diesel fuel storage capacity and the requirement to limit weight on board as much as possible. As shown in FIG. 3, a lobster fishing boat 11 does not have excess space for holding large fuel oil storage tanks on board the cramped quarters of the lobster fishing boat 11.

The water within chamber 2 for cleaning the lobster traps is heated to a predetermined temperature below the boiling point of water, preferably between 140-160 degree Fahrenheit heat, at one bar of atmospheric pressure. The lobster trap 3 is immersed within the heated water in the lobster trap cleaning chamber 2 of the present apparatus 1, in order to kill and remove marine growth on the traps and lines 4 of the lobster traps 3, such as barnacles, algae, sea organisms and other debris.

Moreover, killing the organisms releases the attached organisms from the surfaces of the lobster trap 3. For example, in about 15 seconds, hard, crusty barnacles become soft and all growths fall off the traps 3 and rope lines 4 shortly after their return to the water.

The apparatus 1 also includes anti-splash features to counteract the effects of pitch and roll of the lobster fishing boat at sea upon the chamber 2. For example, horizontal floating baffle 6, within the chamber 2, stabilizes the surface action of water within the chamber 2, to prevent spillage while the apparatus 1 is being operated during pitch and roll conditions at sea.

The chamber 2 also includes an inwardly extending lip edge 12, having horizontal walls 22, which edge 12 prevents heated water from splashing out over the upper edges of chamber 2, while chamber 2 is in use cleaning lobster traps 3 aboard the boat, while drifting at the hauling site of the lobster traps 3 within the sea.

The heat source for heating element 7 is preferably fuel oil burner 9, which burner 9 runs off of the conventional battery 27 and diesel engine 34 fuel supply of the boat 11.

The immersion chamber 2 is insulated by means of a hollow frame 13 having walls 2A, 2B, 2C, and 2D, each wall having an outer panel 14 and inner panel 15 provided on the outside of walls 2A, 2B, 2C, 2D of chamber 2.

When in use, chamber 2 cleans lobster traps 3 without the need to use cleaning chemicals, under adverse sea conditions, with limited spatial resources and with strict safety requirements, given the pitch and roll of the lobster boat 11 at sea.

Drain 20 drains debris from chamber 2. Debris of a first large predetermined size, such as shells or barnacles, is caught by an optional filter, such as filter board 18 having filter holes 19, 19a, 19b, 19c, etc. The holes 19, 19a, 19b, 19c, etc. permit smaller debris of a second predetermined size to fall therethrough, to be flushed out drain 20 from chamber 2.

OPERATION

In operation, there is a provided a chemical-free lobster trap cleaning apparatus 1 for use on board a boat 11 at sea. The apparatus 1 has a base 16, a hollow chamber 2 having a bottom floor 21, a plurality of upwardly extending walls 2A, 2B, 2C, 2D and an open top opening 5. The water containing chamber 2 is used for inserting and heating the lobster trap 3 at approximately 1 bar of atmospheric pressure, at a temperature below boiling point of water, traditionally measured at 212° F. or 100° C. at sea level.

The chamber 2 holds water for cleaning the lobster traps 3 immersed therein to permit convenient and effective cleaning of marine organisms and debris at a lobster trap site at sea. The chamber 2 supports lobster trap 3 within chamber 2, and chamber 2 communicates with heating element 7 for heating the water. The heating element 7 is positioned within the chamber 2. Heating element 7 communicates at an input end 7a with a heat source and at an output end 7b with an exhaust means 10.

The heating element 7 includes a guidance means for advancing heating flame in a forward direction through the heating element 7 by means of a plurality of vertically extending baffle walls 8, 8a, 8b, 8c, etc. extending substantially parallel to the forward direction of the heating flame through the heating element 7.

The plurality of vertically extending baffles each have a front end and a rear end. The vertical extending baffles 8, 8a, 8b, 8c, etc. are placed parallel to each other, and are also placed parallel to the forward direction of the heating flame, in a V shaped configuration, wherein the baffles 8, 8a, 8b, 8c, etc. form a peak at the exit end, and a V shaped vacuity at the entrance end of heating flame to chamber 2.

The heat source for heating the water within chamber 2 is preferably a fuel oil burner for supplying energy to the heating element 7. Preferably as shown in FIG. 3, the boat's battery system 27 is disposed to fuel oil burner 9, for operating fuel oil burner 9 when boat 11 is located at sea.

As further shown in FIG. 3 apparatus 1 optionally includes a plurality of safety switches, 28, 28a, 29 capable of delivering an electric impulse and a plurality of electrical relays 30, 30a, 31, each relay 30, 30a, 31 including a switch 28, 28a, 29, the relay switches 28, 28a, 29 being for connecting and disconnecting the fuel oil burner 9 with the boat's electrical system 27.

A first electrical relay 30 and switch 28 are responsive to electrical impulses delivered by a time sensitive timer 32 and alternately a first further relay 30 may be further responsive to electrical impulses delivered by the safety switch 28a when a temperature of the heating fluid within heat sensor 32a within chamber 2 reaches a predetermined high or low level.

Furthermore, a further safety switch 29 and relay 31 are capable of connecting and disconnecting the energy supply of battery 27 from the fuel oil burner 9 to the heating element 2, when the second further safety switch 29 is mechanically impacted further motion sensor 33 measuring predetermined oscillation of the boat during excessive pitch and roll of boat 11 at sea, thus allowing the chamber 2 to be operational when the boat is at a predetermined position of equilibrium.

The apparatus 1 further has a means to limit spillage of water while the apparatus is being transported by the boat 11 to the site of the lobster traps at sea, such as a floating baffle board 6 floating upon the water contained within the chamber 2.

To prevent spillage of the heated water while boat 11 is anchored on site where the lobster traps 3 are hauled, chamber 2 includes an inwardly extending lip edge 12, having horizontal walls 22, extending in from the plurality of upwardly extending walls 2A, 2B, 2C, 2D of said chamber 2 each wall having an upper end, and a lower end joined to base 16. Inwardly extending lip walls 22 of inwardly extending lip 12 are horizontally mounted upon each of the upper ends of walls 2A, 2B, 2C, 2D to substantially prevent spillage of heated water from chamber 2 while the boat 11 is drifting under pitch and roll conditions at sea at the site of lobster traps 3.

When boat 11 is drifting at the site where the lobster traps 3 are hauled, the lobster traps 3 may be immersed within chamber 2 over floating baffle 6, thereby causing floating baffle 6 to sink within the water within chamber 2, when drifting. Since boat 11 is not travelling with excess pitch and roll, only inwardly extending lip 12 is needed to prevent heated water from spilling over the upper edge of chamber 2. The inwardly extending lip edge 12 extends inwardly from the top edges of the plurality of the upwardly extending walls 2A, 2B, 2C, 2D of chamber 2.

Chamber 2 further includes a hollow channel-like enclosure for accepting and immersing the lobster trap 3 freely upon heating element 7. The hollow enclosure further has a top side with an open top passageway 5 for permitting the through-insertion of the lobster trap 3 for continuous cleaning of the lobster trap 3 within the hollow enclosure of chamber 2, as a heating flame moves forward through heating element 7 to heat water at a predetermined temperature below boiling, at approximately one bar of atmospheric pressure.

Each wall 2A, 2B, 2C or 2D of chamber 2 includes an insulation portion 13, having a spaced apart pair of panels 14, 15 each respectively and vertically located over insulation portion 13. Therefore, each respective wall 2A, 2B, 2C, 2D has a central cavity panels 14, 15 between for insulating the heated water within chamber 2 from the exterior of chamber 2.

Moreover, chamber 2 is provided with a pair of bores 23, 24 therethrough, the bores respectively being positioned to facilitate the forward direction of heating flame between heat source 9 and output end 10 of apparatus 1, so as to pass the heating flame forwardly through the respective registered bores 23, 24 of chamber 2. Through-bore 23 is further provided with respective joint 26 and through-bore 24 is provided with respective joint 25 for receiving and holding heating element 7 within said chamber 2.

In summary, the present invention includes an apparatus 1 for cleaning multi-slatted, multi-corded lobster traps 3 and 3A on board a lobster boat 11, including a hollow heating chamber 2 for immersion of the lobster traps 3.

The chamber 2 is adapted to hold heated water for cleaning the lobster traps 3, and is heated by a heating element 7 within the chamber 2 for raising and maintaining the temperature of the water within the chamber 2.

As noted, to provide heat, a hollow sealed heating element 7 communicates with fuel burner 9, thereby providing heated gas to the sealed heating element 7. The sealed heating element 7 is provided with a plurality of generally vertical linear baffles 8, 8a, 8b, 8c etc. for directing heated gas fluid through sealed heating element 7 for heating the water, within which the lobster traps 3 are immersed. The rear ends of baffles 8, 8a, 8 b, 8c etc. within heating element 7 are placed in a generally V-shaped configuration within the sealed heating element, for directing the heated gas from one input end 7A of the sealed heating element 7 to an output end 7B of sealed heating element 7.

Moreover, there is provided a means to insulate the chamber 2, including a plurality of first interior wall panels 15 adjacent to the chamber 2. A plurality of second, exterior extension wall panels 14 extend in a spaced relation away from first interior walls, so that the second extension walls 14 define an exterior of the heated chamber 2. Finally, a mounting means 16 with footings 17 is provided for mounting the heated chamber 2 upon a deck of the lobster boat 11.

Therefore, the present invention solves the long felt need of lobster boat fishermen to utilize an apparatus for cleaning lobster traps of marine debris on site at sea, without the need for cleaning chemicals or high pressure water systems, thus efficiently cleaning the lobster traps without damaging the fragile vinyl covered wire or wooden elements of the traditional lobster traps used at sea.

Other modifications will become apparent to those skilled in the lobster fishing art, and such modifications may be made to the present invention without departing from the spirit and scope of the present invention, as noted in the appended claims.

We claim:

1. A chemical free lobster trap cleaning apparatus for use on board a boat at sea, said lobster trap cleaning apparatus comprising a base, a hollow water containing chamber having a bottom floor, a plurality of upwardly extending walls and an open top opening between a top edge of each of said upwardly extending walls, a means for heating the lobster trap at atmospheric pressure, at a water temperature below boiling point of water temperature measured at 212 degrees F. at sea level, said means comprising a heating element within said water containing chamber, said chamber holding water for cleaning the lobster traps immersed therein to permit convenient and effective cleaning of marine organisms and debris at a lobster trap site at sea, said water containing chamber supporting the lobster trap above the said heating element within said water containing chamber, said heating element being capable of heating the water to a temperature below the water temperature boiling point of 212 degrees F. at sea level within said water containing chamber, said heating element communicating at an input end of said chamber with a heat source and at an output end of said chamber with an exhaust means, said heating element producing a heating flame therein, said heating element further having a guidance means for directionally guiding the heating flame therethrough.

2. The apparatus of claim 1, further comprising a means to limit spillage of water while said apparatus is being transported by the boat to a site of the lobster traps at sea, said means comprising a floatable baffle board floatable above the water within said chamber.

3. The apparatus as in claim 2, wherein said means to limit spillage of water further comprises an inwardly extending lip edge extending inwardly from said top edges of said plurality of said upwardly extending chamber walls.

4. The apparatus of claim 3, wherein the said plurality of upwardly extending walls of said chamber comprises a plurality of elongated, substantially vertical walls each having an upper end and a lower end, joined to said base, each said upper end further being provided with one of a plurality of inwardly extending lip edges being horizontally mounted upon each of said upper ends of said walls, to permit substantially spillage-less contact of said heated water with the surfaces of said lobster trap, while the boat is drifting under pitch and roll conditions at sea at the site of the lobster trap, said chamber further comprising a hollow chamber for accepting and immersing the lobster trap freely upon said heating element, said hollow chamber further having a top side, said top side being provided with an open top passageway for permitting the through-insertion of the lobster trap and for allowing the continuous cleaning of the lobster trap within said chamber as a heating flame moves forward through said heating element to heat the water at a predetermined water temperature below boiling point of 212° F. at approximately one bar of atmospheric pressure, said open passageway disposed on the top side of said hollow chamber.

5. The apparatus of claim 4, wherein each wall of said chamber is provided with an insulated portion, each said insulated portion having a spaced apart pair of insulation panels and insulation material therebetween, each pair of insulation panels respectively and vertically containing and enclosing said insulation material, and further, each respective pair of panels having a central cavity therebetween, each respective pair of panels providing mechanical support for said chamber, said of insulation material insulating the heated water within said chamber from an exterior of said chamber.

6. The apparatus of claim 5, wherein said chamber is provided with a pair of bores therethrough, the bores respectively being in positional register with the forward direction of said heating flame between said heat source and said output end of said chamber, so as to pass said heating flame forwardly through said respective bores of said chamber, each respective through-bore being further provided with joint conduits for receiving and holding said heating element within said chamber.

7. The apparatus as in claim 4 further comprising a filter having a plurality of through-holes said filter capable of capturing a first quantity of debris of a predetermined size and said filter capable of passing therethrough a second quantity of debris of a size smaller than said first quantity of debris, through said filter and out a drain from said chamber.

8. The apparatus of claim 1, wherein said guidance means for advancing the heating flame in a forward direction through said heating element comprises a plurality of vertically extending baffle walls within said chamber, said baffle walls extending substantially parallel to the forward direction of the heating fluid through said heating element.

9. The apparatus as in claim 8 wherein said plurality of vertically extending baffle walls each have a front end and a rear end, said vertical extending baffle walls placed parallel to each other of said baffle walls and said baffle walls placed parallel to the forward direction of the heating flame, wherein said rear ends of said baffle walls form a V shaped configuration.

10. The apparatus of claim 1, wherein said heat source comprises a fuel oil burner providing heat to said heating element; said apparatus further having a battery disposed to said fuel oil burner for starting said heat source when the boat is located at sea.

11. The apparatus of claim 10 further comprising a plurality of safety switches, capable of delivering an electrical impulse and a plurality of electrical relays, each respective relay responsive to each respective switch each respective relay and each respective switch responsive to electrically connecting and disconnecting said fuel oil burner from said heating element.

12. The apparatus of claim 11 further comprising at least one further safety switch and at least one further relay for electrically connecting and disconnecting said diesel burner with said heating element, said at least one further switch and said at least one further relay being responsive to impulses delivered by a timer.

13. The apparatus of claim 11 further comprising at least one second further safety switch and second further relay capable of connecting and disconnecting the energy supply from said diesel burner to said heating element, said second further safety switch capable of stopping said energy supply when said second further safety switch is mechanically impacted by a motion sensor sensing a predetermined oscillation of the boat during pitch and roll at sea.

14. The apparatus as in claim 11 further comprising at least one of said electrical relays being responsive to electrical impulses delivered by said at least one safety switch when a temperature of said heating element reaches a predetermined high level.

15. The fuel oil burner as in claim 10 wherein said fuel oil burner is in communication with a diesel engine and a battery of the boat.

16. The apparatus as in claim 1 wherein said heating element heats said water to a temperature of between 140–160 degrees Fahrenheit within which heated water said lobster trap being imersable for killing marine growth on the slats and lines of the lobster trap.

17. The base as in claim 1 wherein said base comprises a plurality of support footings elevating said chamber above from a floor of the boat supporting said apparatus.

18. An apparatus for cleaning multi-slatted, multi-corded lobster traps on board a lobster boat comprising:
  a hollow heating chamber for immersion of the lobster traps,
  said chamber adapted to hold heated water for cleaning the lobster traps,
  a heating means within said chamber for raising and maintaining the temperature of said water within said chamber,
  said heating means comprising a hollow sealed heating element in communication with a fuel burner providing heated gas to said sealed heating element,
  said sealed heating element being provided with a plurality of generally vertical linear baffles for directing said heated gas through said sealed heating element for heating said water within said chamber,
  said baffles being placed in a generally V-shaped configuration within said sealed heating element for directing said heated gas from one input end of said sealed heating element to an output end of said sealed heating element,
  an output conduit for releasing said heated gas from said sealed heating element,
  said chamber adapted to rinse and clean the lobster traps therein,
  a means to prevent spillage of heated water during use, said means including an inwardly extending lip extending from a top edge of said chamber, said extending lip defining an entry hold for insertion of said lobster traps therethrough to said chamber,
  a means to insulate said chamber, said means including a plurality of first interior walls adjacent to said chamber, a plurality of second extension walls extending in spaced relation exterior and away from said first interior walls, said second extension walls defining an exterior of said heated chamber, and
  a mounting means for mounting said heated chamber upon a deck of the boat.

* * * * *